United States Patent
Kobayashi et al.

(10) Patent No.: US 10,875,357 B2
(45) Date of Patent: Dec. 29, 2020

(54) FIXED CONSTANT VELOCITY UNIVERSAL JOINT, AND BEARING DEVICE FOR WHEELS

(71) Applicant: NTN CORPORATION, Osaka (JP)

(72) Inventors: Tomoshige Kobayashi, Shizuoka (JP); Yuichi Asano, Shizuoka (JP)

(73) Assignee: NTN CORPORATION, Osaka (JP)

( * ) Notice: Subject to any disclaimer, the term of this patent is extended or adjusted under 35 U.S.C. 154(b) by 366 days.

(21) Appl. No.: 15/769,225

(22) PCT Filed: Oct. 4, 2016

(86) PCT No.: PCT/JP2016/079508
§ 371 (c)(1),
(2) Date: Apr. 18, 2018

(87) PCT Pub. No.: WO2017/073269
PCT Pub. Date: May 4, 2017

(65) Prior Publication Data
US 2018/0304678 A1    Oct. 25, 2018

(30) Foreign Application Priority Data
Oct. 27, 2015   (JP) .................................. 2015-210968

(51) Int. Cl.
*B60B 27/00*   (2006.01)
*F16C 19/18*   (2006.01)
(Continued)

(52) U.S. Cl.
CPC .......... *B60B 27/0036* (2013.01); *F16C 19/18* (2013.01); *F16C 19/181* (2013.01);
(Continued)

(58) Field of Classification Search
CPC ...... B60B 27/0036; F16C 19/18; F16C 35/07; F16C 19/181; F16C 2326/02; F16D 3/223;
(Continued)

(56) References Cited

U.S. PATENT DOCUMENTS 3,858,412 A * 1/1975 Fisher ...................... F16D 3/227
                                                                        464/906
5,222,914 A * 6/1993 Mazziotti ................ F16D 3/227
                                                                        464/145
(Continued)

FOREIGN PATENT DOCUMENTS

EP   3 269 991   1/2018
EP   3 369 955   9/2018
(Continued)

OTHER PUBLICATIONS

International Search Report dated Dec. 27, 2016 in International (PCT) Application No. PCT/JP2016/079508.
(Continued)

*Primary Examiner* — Greg Binda
(74) *Attorney, Agent, or Firm* — Wenderoth, Lind & Ponack, L.L.P.

(57) ABSTRACT

A fixed type constant velocity universal joint includes an outer joint member having a cup shape, an inner joint member, which is received in the outer joint member, and transmits torque between the inner and outer joint members through intermediation of balls while allowing angular displacement, and a hollow shaft, which is coupled to the inner joint member so as to allow torque transmission. A threaded hole is formed in a bottom portion of the outer joint member along an axial direction. A recessed hole is formed to be open in a shaft end portion of the hollow shaft opposed to the threaded hole. An embedded stopper that enters the threaded hole is press-fitted into the recessed hole. The embedded (Continued)

stopper is retractable into the hollow shaft in a press-fitting direction.

4 Claims, 7 Drawing Sheets

(51) Int. Cl.
*F16C 35/07* (2006.01)
*F16D 3/223* (2011.01)
*F16D 3/224* (2011.01)

(52) U.S. Cl.
CPC .............. *F16C 35/07* (2013.01); *F16D 3/223* (2013.01); *F16D 3/224* (2013.01); *F16C 2326/02* (2013.01); *F16D 2003/22313* (2013.01); *F16D 2003/22326* (2013.01); *Y02T 10/86* (2013.01); *Y10S 464/906* (2013.01)

(58) Field of Classification Search
CPC ........... F16D 3/224; F16D 2003/22326; F16D 2003/22313; Y10S 464/906; Y02T 10/86
USPC ........................................ 464/145, 178, 906
See application file for complete search history.

(56) References Cited

U.S. PATENT DOCUMENTS

| | | |
|---|---|---|
| 6,146,022 A | 11/2000 | Sahashi et al. |
| 2001/0016520 A1 | 8/2001 | Sahashi et al. |
| 2017/0030415 A1 | 2/2017 | Oh et al. |
| 2018/0313406 A1 | 11/2018 | Asano et al. |

FOREIGN PATENT DOCUMENTS

| | | |
|---|---|---|
| JP | 03-113124 | 5/1991 |
| JP | 2000-74083 | 3/2000 |
| JP | 2001-280359 | 10/2001 |
| JP | 2016-169825 | 9/2016 |
| WO | 2015/153431 | 10/2015 |

OTHER PUBLICATIONS

International Preliminary Report on Patentability and Written Opinion of the International Searching Authority dated May 1, 2018 in International (PCT) Application No. PCT/JP2016/079508.
Extended European Search Report dated May 8, 2019 in corresponding European Patent Application No. 16859506.4.

* cited by examiner

FIXED CONSTANT VELOCITY UNIVERSAL JOINT, AND BEARING DEVICE FOR WHEELS

TECHNICAL FIELD

The present invention relates to a fixed type constant velocity universal joint, which is to be used in power transmission systems for automobiles and various industrial machines, in particular, is to be mounted to a drive shaft for a rear wheel of an automobile and a propeller shaft for an automobile, and relates to a bearing device for a wheel to which the constant velocity universal joint is assembled.

BACKGROUND ART

As a constant velocity universal joint which is used as a unit configured to transmit a rotational force at constant velocity from an engine to a wheel of an automobile, there are given two types, specifically, a fixed type constant velocity universal joint and a plunging type constant velocity universal joint. Both of those constant velocity universal joints each have a structure capable of coupling two shafts on a driving side and a driven side to each other, and transmitting rotational torque at constant velocity even when each of the two shafts forms an operating angle.

It is required that a drive shaft configured to transmit power from an engine to a wheel of an automobile be adaptable to angular displacement and axial displacement caused by a change in relative positional relationship between the engine and the wheel. Therefore, in general, the drive shaft has the following structure. The plunging type constant velocity universal joint which allows both the axial displacement and the angular displacement is installed on the engine side (inboard side), and the fixed type constant velocity universal joint which allows only the angular displacement is installed on the wheel side (outboard side). Both the constant velocity universal joints are coupled to each other through intermediation of the shaft.

The fixed type constant velocity universal joint described above cannot allow the axial displacement, but can allow a large operating angle (maximum operating angle of 45° or more). In this respect, the fixed type constant velocity universal joint described above is applied to a wheel side of a drive shaft for a front wheel of an automobile in many cases.

Meanwhile, the fixed type constant velocity universal joint is applied to a wheel side of a drive shaft for a rear wheel of an automobile or a propeller shaft for an automobile in some cases. In this case, unlike for the front wheel of an automobile, it is not required to set the maximum operating angle to 45° or more. For the rear wheel of an automobile, the maximum operating angle is 30° or less, and for the propeller shaft, the maximum operating angle is 10° or less.

As described above, in the drive shaft for a rear wheel of an automobile, the maximum operating angle is 30° or less, which is small. Therefore, in order to attain reduction in weight and cost of the constant velocity universal joint, there is used an outer joint member, which is reduced in axial dimension by shortening track grooves as compared to an outer joint member to be used in the drive shaft for a front wheel of an automobile.

At the time of assembling the constant velocity universal joint, under a state in which an angle equal to or larger than the maximum operating angle is formed, balls are incorporated. At the time of handling the constant velocity universal joint having the balls incorporated therein, for example, at the time of transporting the constant velocity universal joint or assembling the constant velocity universal joint to a vehicle body, components including an outer joint member, an inner joint member, a cage, and the balls are in a free state. In the free state, the constant velocity universal joint may form an angle which exceeds the maximum operating angle due to own weights of the components.

Even when the constant velocity universal joint forms an operating angle which is larger than the maximum operating angle as described above, in the constant velocity universal joint to be used in the drive shaft for a front wheel of an automobile, the shaft interferes with the outer joint member at an angle smaller than an angle which causes the balls to drop off, thereby preventing the balls from slipping and dropping off the track grooves of the outer joint member.

However, in the constant velocity universal joint including the outer joint member having a small axial dimension as described above, which is to be used in the drive shaft for a rear wheel of an automobile, when an operating angle which is larger than the maximum operating angle is formed, the operating angle exceeds the angle which causes the balls to drop off before the shaft interferes with the outer joint member, with the result that the balls slip and drop off the track grooves of the outer joint member.

In view of the above, there have been proposed various constant velocity universal joints each having a measure for preventing the balls from slipping and dropping off the track grooves of the outer joint member at the time of handling the constant velocity universal joint (for example, see Patent Literatures 1 and 2).

CITATION LIST

Patent Literature 1: JP 3-113124 A
Patent Literature 2: JP 2001-280359 A

SUMMARY OF INVENTION

Technical Problem

Incidentally, the constant velocity universal joints disclosed in Patent Literature 1 and Patent Literature 2, which each have the measure for preventing the balls from slipping and dropping off the track grooves of the outer joint member at the time of handling the constant velocity universal joint, have the following structures and problems.

The constant velocity universal joint disclosed in Patent Literature 1 has such stopper structure that an extended portion is formed on a shaft end portion of a shaft fitted to an inner joint member, and that the extended portion of the shaft is abuttable against a bottom portion of an outer joint member.

In the constant velocity universal joint, when the shaft forms an operating angle, which is larger than the maximum operating angle, with respect to the outer joint member, the extended portion of the shaft interferes with the bottom portion of the outer joint member, thereby preventing the balls from slipping and dropping off the track grooves of the outer joint member.

However, in a case of the constant velocity universal joint disclosed in Patent Literature 1, the shaft end portion of the shaft is elongated more than necessary, with the result that a weight of the shaft is increased. This increase in weight of the shaft involves a difficulty in reducing a weight of the constant velocity universal joint.

The constant velocity universal joint disclosed in Patent Literature 2 has such stopper structure that a protrusion is formed on a shaft fitted to an inner joint member on a portion of the shaft at a vicinity of an opening portion of an outer joint member, and that the protrusion is abuttable against an opening end portion of the outer joint member.

In the constant velocity universal joint, when, with respect to the outer joint member, the shaft forms an operating angle larger than the maximum operating angle, the protrusion of the shaft interferes with the opening end portion of the outer joint member. With this structure, the balls are prevented from slipping and dropping off track grooves of the outer joint member.

However, in a case of the constant velocity universal joint disclosed in Patent Literature 2, the protrusion is formed on the shaft. Thus, it is required to increase a material diameter before cutting work is performed to obtain the shaft. As a result, it is required to perform cutting work on the shaft to form the protrusion, and a material having a large diameter is required as a material for the shaft. Accordingly, in view of cost of cutting work and material, it is difficult to reduce cost of the constant velocity universal joint.

Therefore, the present invention has been proposed in view of the above-mentioned problems, and has an object to prevent balls from dropping off an outer joint member at the time of handling a constant velocity universal joint, and to achieve reduction in weight and cost of the constant velocity universal joint.

Solution to Problem

According to one embodiment of the present invention, there is provided a fixed type constant velocity universal joint, comprising: an outer joint member having a cup shape; an inner joint member, which is received in the outer joint member, and is configured to transmit torque between the inner joint member and the outer joint member through intermediation of balls while allowing angular displacement; and a shaft, which is coupled to the inner joint member so as to allow torque transmission.

As a technical measure for achieving the above-mentioned object, according to one embodiment of the present invention, a through-hole is formed in a bottom portion of the outer joint member along an axial direction. A recessed portion is formed to be open in a shaft end portion of the shaft opposed to the through-hole. An angle regulating member that enters the through-hole is press-fitted into the recessed portion. The angle regulating member is retractable into the shaft in a press-fitting direction.

In the present invention, the angle regulating member, that enters the through-hole of the bottom portion of the outer joint member, is press-fitted into the recessed portion of the shaft end portion of the shaft. Thus, at the time of handling the constant velocity universal joint, the angle regulating member in the shaft interferes with the through-hole of the outer joint member at an angle smaller than an angle causing the balls to drop off. The angle regulating member exerts a stopper function of regulating the operating angle of the shaft through interference with the through-hole. As a result, at the time of handling the constant velocity universal joint, the balls can be prevented from slipping and dropping off the outer joint member.

As described above, the operating angle of the shaft is regulated through interference between the angle regulating member on the shaft and the through-hole of the outer joint member. Accordingly, unlike in the related art, it is not required to extend the shaft end portion of the shaft. Thus, a weight of the constant velocity universal joint can be reduced. Further, it is not required to form the protrusion on the shaft. Thus, the material diameter of the shaft can be reduced, and cost of the constant velocity universal joint can be reduced.

In the present invention, the angle regulating member is retractable into the shaft in the press-fitting direction. Thus, after assembling the constant velocity universal joint to a vehicle body, the angle regulating member is retracted into the shaft, thereby being capable of canceling the stopper function of the angle regulating member for regulating the operating angle of the shaft. As a result, the constant velocity universal joint assembled to the vehicle body can form a required operating angle.

According to one embodiment of the present invention, it is desired to adopt a structure in which the shaft has such a hollow shape that the recessed portion passes through the shaft in the axial direction. When this structure is adopted, the shaft has a hollow shape. Accordingly, reduction in weight of the constant velocity universal joint can be more easily achieved.

According to one embodiment of the present invention, there is provided a bearing device for a wheel, comprising a bearing for a wheel including: an outer member having double-row outer raceway surfaces formed on an inner peripheral surface thereof; an inner member having double-row inner raceway surfaces formed on an outer peripheral surface thereof to be opposed to the double-row outer raceway surfaces; and double-row rolling elements, which are interposed between the double-row outer raceway surfaces of the outer member and the double-row inner raceway surfaces of the inner member. The inner member of the bearing for a wheel and the outer joint member of the fixed type constant velocity universal joint are coupled to each other so as to allow torque transmission. The through-hole of the outer joint member is formed into a threaded hole. The angle regulating member is pushed out of the threaded hole and is retracted into the shaft in the press-fitting direction by threadedly engaging a threaded portion of a bolt with the threaded hole.

In the present invention, the threaded portion of the bolt threadedly engaged with the threaded hole pushes the angle regulating member out of the threaded hole, and thus retracts the angle regulating member into the shaft in the press-fitting direction. Thus, after assembling the constant velocity universal joint to the bearing for a wheel, with simple means, the stopper function of the angle regulating member for regulating the operating angle of the shaft can be easily canceled. As a result, it can be easily achieved that the constant velocity universal joint assembled to the bearing for a wheel forms a required operating angle.

Advantageous Effects of Invention

According to the present invention, at the time of handling the constant velocity universal joint, the angle regulating member in the shaft interferes with the threaded hole of the outer joint member at the angle smaller than the angle causing the balls to drop off. Thus, the angle regulating member exerts the stopper function of regulating the operating angle of the shaft through interference with the threaded hole. With this structure, at the time of handling the constant velocity universal joint, the balls can be prevented from slipping and dropping off the outer joint member. Thus, owing to the stopper structure involving interference between the threaded hole of the outer joint member and the angle regulating member of the shaft, reduction in weight and cost of the constant velocity universal joint can be achieved.

DESCRIPTION OF EMBODIMENTS

Now, a fixed type constant velocity universal joint according to embodiments of the present invention is described in detail with reference to the drawings.

In the embodiments described below, for example, a Rzeppa type constant velocity universal joint (BJ) being one of fixed type constant velocity universal joints to be mounted to a drive shaft for an automobile is exemplified. However, the present invention is also applicable to an undercut-free type constant velocity universal joint (UJ) being another one of the fixed type constant velocity universal joints.

It is required that a drive shaft configured to transmit power from an engine to a wheel of an automobile be adaptable to angular displacement and axial displacement caused by a change in relative positional relationship between the engine and the wheel. Therefore, in general, the drive shaft has the following structure. A plunging type constant velocity universal joint which allows both the axial displacement and the angular displacement is installed on the engine side (inboard side), and the fixed type constant velocity universal joint which allows only the angular displacement is installed on the wheel side (outboard side). Both the constant velocity universal joints are coupled to each other through intermediation of the shaft.

Figure 1:
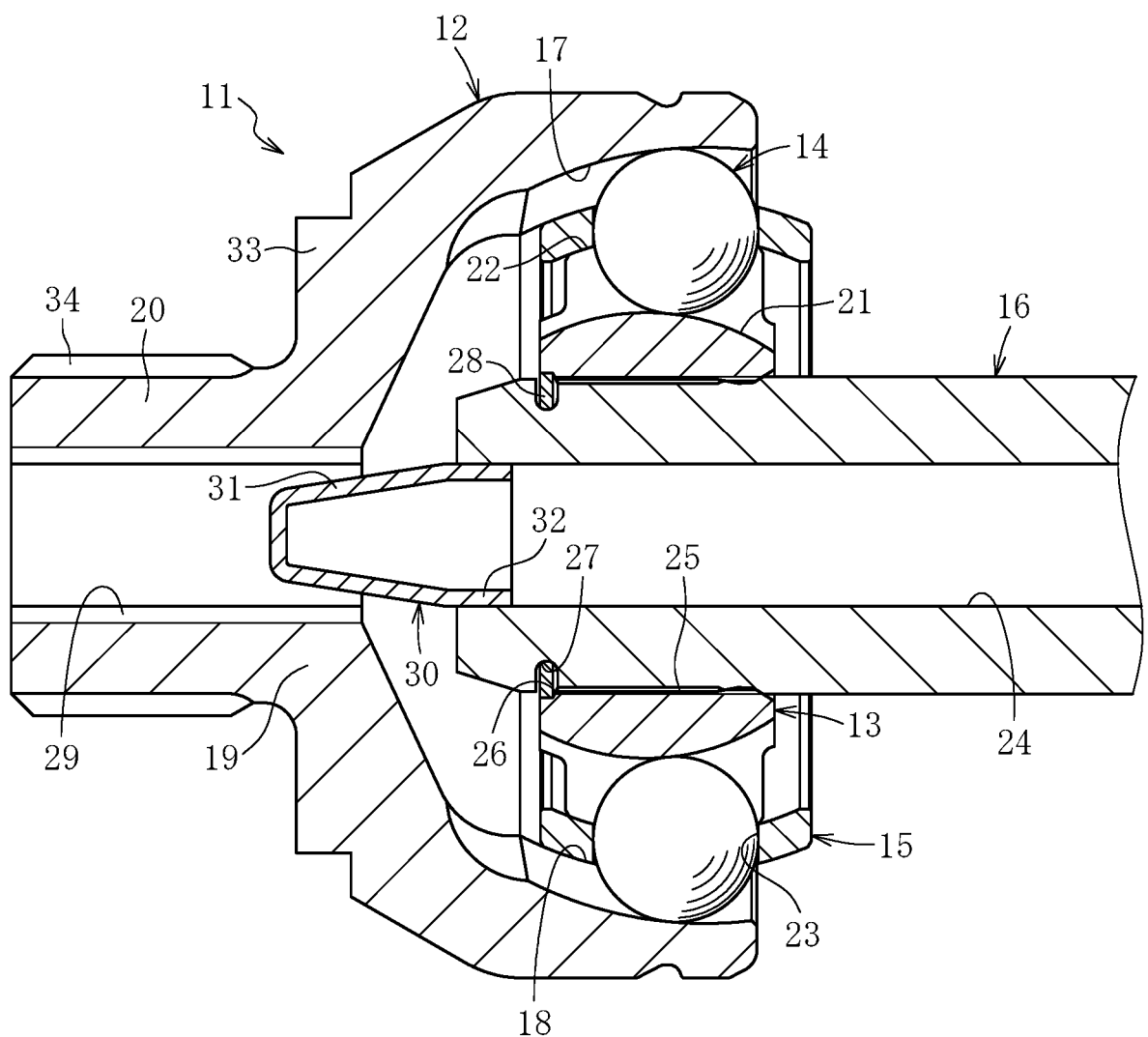
FIG. 1 is a sectional view for illustrating a state in which an operating angle of a hollow shaft is 0° in a fixed type constant velocity universal joint according to an embodiment of the present invention.

As illustrated in FIG. 1, a constant velocity universal joint 11 according to this embodiment comprises an outer joint member 12 having a cup-shape, an inner joint member 13, a plurality of balls 14, and a cage 15. A hollow shaft 16 is coupled to the constant velocity universal joint 11 so as to extend from the inner joint member 13 and project from an opening portion of the outer joint member 12.

The outer joint member 12 has arc-shaped track grooves 17 extending in an axial direction. The track grooves 17 are formed equiangularly at a plurality of portions in a spherical inner peripheral surface 18. Further, a stem portion 20 is formed integrally with a bottom portion 19 of the outer joint member 12 so as to extend in the axial direction. The stem portion 20 is coupled to a bearing 51 for a wheel (see FIG. 5), which is configured to rotationally support a wheel. The inner joint member 13 has arc-shaped track grooves 21. The track grooves 17 are paired with the track grooves 17 of the outer joint member 12, and are formed equiangularly at a plurality of portions in a spherical outer peripheral surface 22.

The balls 14 are interposed between the track grooves 17 of the outer joint member 12 and the track grooves 21 of the inner joint member 13. The balls 14 are configured to transmit rotational torque between the outer joint member 12 and the inner joint member 13. The cage 15 is interposed between the inner peripheral surface 18 of the outer joint member 12 and the outer peripheral surface 22 of the inner joint member 13. The cage 15 has a plurality of pockets 23, which are configured to retain the balls 14 and are formed equiangularly at a plurality of portions in the cage 15.

The hollow shaft 16 has a recessed hole 24 passing through the hollow shaft 16 in the axial direction. The hollow shaft 16 is press-fitted into a shaft hole 25 of the inner joint member 13, and is coupled to the inner joint member 13 by spline fitting so as to allow torque transmission. A step 26 is formed on a deep-side end surface of the inner joint member 13, and an annular recessed groove 27 is formed in the shaft end portion of the hollow shaft 16. A snap ring 28 fitted in the recessed groove 27 is locked on the step 26 of the inner joint member 13. Thus, the hollow shaft 16 is prevented from slipping off the inner joint member 13.

In the constant velocity universal joint 11 having the above-mentioned configuration, when an operating angle is formed by the hollow shaft 16 between the outer joint member 12 and the inner joint member 13, the balls 14 retained in the cage 15 are always maintained within a plane obtained by bisection of the operating angle at any operating angle. Accordingly, constant velocity is secured between the outer joint member 12 and the inner joint member 13. Rotational torque is transmitted between the outer joint member 12 and the inner joint member 13 through intermediation of the balls 14 under the state in which the constant velocity is secured therebetween as described above.

In the constant velocity universal joint 11 to be used in the drive shaft for a rear wheel of an automobile, a maximum operating angle is 30° or less, which is small. Therefore, there is used the outer joint member 12, which is reduced in axial dimension by shortening the track grooves 17 as compared to a constant velocity universal joint to be used in the drive shaft for a front wheel of an automobile. With this configuration, reduction in weight and cost of the constant velocity universal joint 11 is attained. Further, also through use of the hollow shaft 16, reduction in weight of the constant velocity universal joint 11 is attained.

Further, when the number of the balls 14 is eight, the track grooves 17 of the outer joint member 12 and the track grooves 21 of the inner joint member 13 can be reduced in depth as compared to a case of a constant velocity universal joint comprising six balls. As a result, thicknesses of the outer joint member 12 and the inner joint member 13 can also be reduced, which is effective in attaining reduction in weight and size. The case of providing the eight balls is one example, and six balls may be provided. The number of the balls 14 may be freely selectable.

Figure 2:
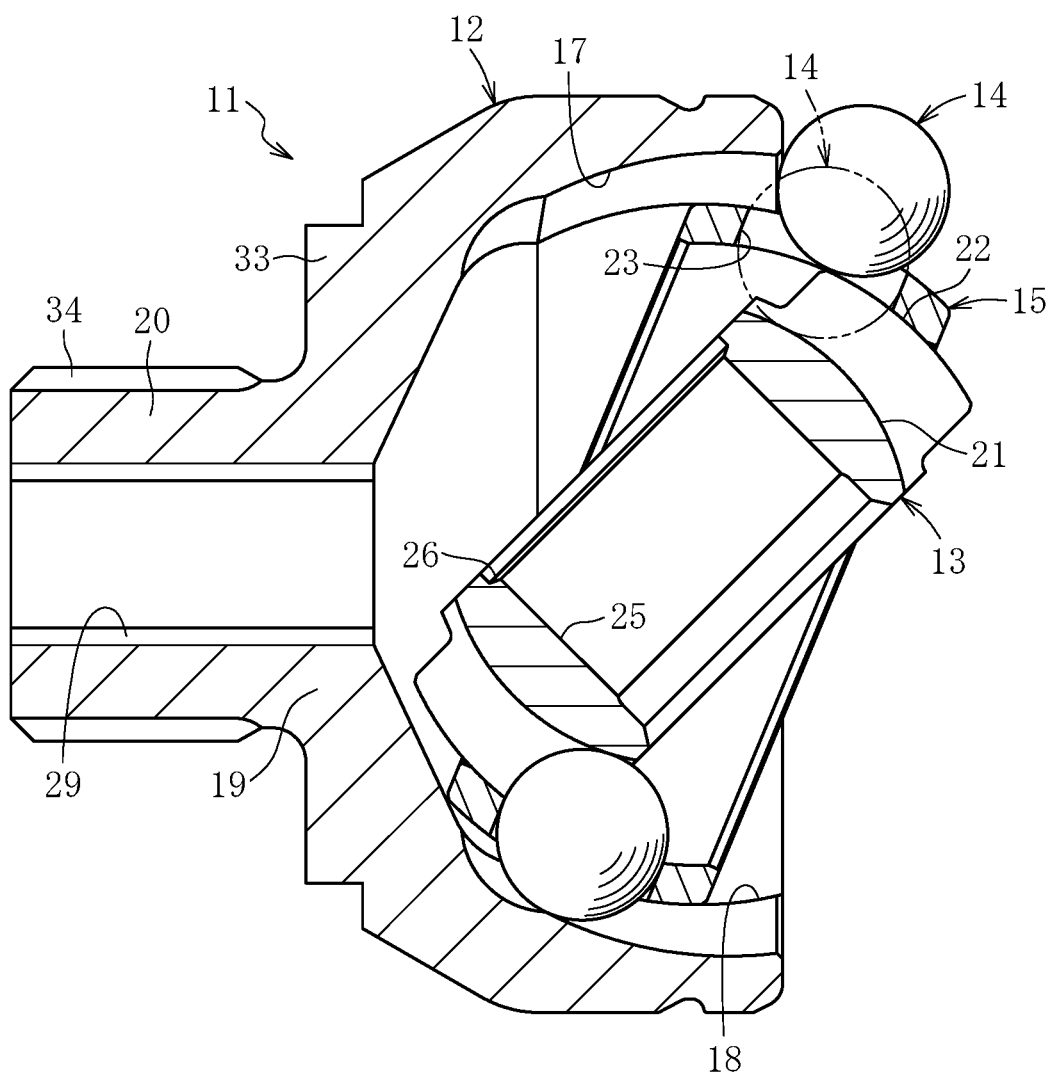
FIG. 2 is a sectional view for illustrating a state in which balls are incorporated into track grooves of an outer joint member and track grooves of an inner joint member of FIG. 1.
Figure 3:
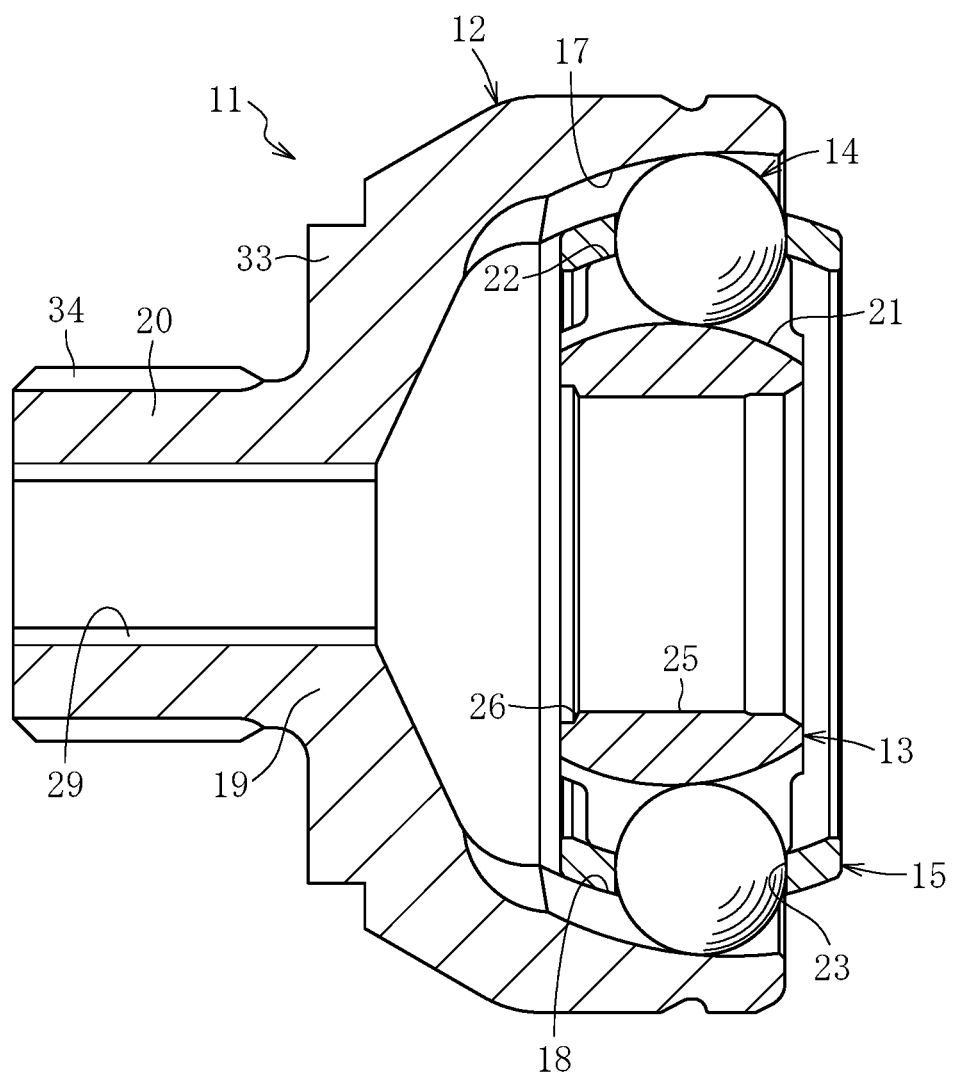
FIG. 3 is a sectional view for illustrating a state after the balls are incorporated into the track grooves of the outer joint member and the track grooves of the inner joint member of FIG. 2.

At the time of assembling the constant velocity universal joint 11, an angle which is equal to or larger than a maximum operating angle is formed as illustrated in FIG. 2. Under this state, a position at which the pocket 23 of the cage 15 is visible without being blocked by the outer joint member 12 is ensured, and then the balls 14 are incorporated. As illustrated in FIG. 3, at the time of handling the constant velocity universal joint 11 having the balls incorporated therein, for example, at the time of transporting the constant velocity universal joint 11 or assembling the constant velocity universal joint 11 to a vehicle body, the outer joint member 12, the inner joint member 13, the balls 14, and the cage 15, which construct the constant velocity universal joint 11, are in a free state. In the free state, the constant velocity universal joint 11 may form an angle which exceeds the maximum operating angle due to own weights of the components (see FIG. 2).

As described above, at the time of handling the constant velocity universal joint 11, even when the outer joint member 12, the inner joint member 13, the balls 14, and the cage 15 constructing the constant velocity universal joint 11 are in the free state, the constant velocity universal joint 11 may form the angle exceeding the maximum operating angle, and the balls 14 may slip and drop off the track grooves 17 of the outer joint member 12. As a measure for preventing the balls 14 from slipping and dropping off, in this embodiment, the following stopper structure is adopted in order to regulate the operating angle of the constant velocity universal joint 11 at the time of handling the constant velocity universal joint 11.

In the stopper structure of the embodiment illustrated in FIG. 1, a threaded hole 29 being a through-hole is formed in the bottom portion 19 of the outer joint member 12 along the axial direction, and the recessed hole 24 is formed to be open in the shaft end portion of the hollow shaft 16 opposed to the threaded hole 29. Further, an embedded stopper 30 is press-fitted into the recessed hole 24 of the hollow shaft 16. The embedded stopper 30 is an angle regulating member that enters the threaded hole 29. The embedded stopper 30 is formed of a hollow member having a tapered shape, and comprises a distal end portion 31 that enters the threaded hole 29, and a proximal end portion 32 to be press-fitted into the recessed hole 24.

An outer diameter of the distal end portion 31 of the embedded stopper 30 is set to be smaller than an inner diameter of the threaded hole 29 of the outer joint member 12, and a gap is formed between the distal end portion 31 of the embedded stopper 30 and an inner peripheral surface of the threaded hole 29. Further, an outer diameter of the proximal end portion 32 of the embedded stopper 30 is set to be slightly larger than an inner diameter of the recessed hole 24 of the hollow shaft 16, and the proximal end portion 32 of the embedded stopper 30 is press-fitted into an inner peripheral surface of the recessed hole 24. However, the press-fitted state of the embedded stopper 30 is set so that the embedded stopper 30 is retractable into the hollow shaft 16 in a press-fitting direction at the time of assembling the bearing 51 for a wheel (see FIG. 5) as described later.

The embedded stopper 30 described above exerts a stopper function together with the threaded hole 29 of the outer joint member 12, and closes the recessed hole 24 having an opening in the shaft end portion of the hollow shaft 16. Thus, the embedded stopper 30 has a function of preventing a lubricant such as grease, which is sealed in the outer joint member 12 with a boot 41 (see FIG. 5) mounted between the outer joint member 12 and the hollow shaft 16, from leaking into the hollow shaft 16 from an inside of the outer joint member 12.

In this embodiment, as an example, description is made of the hollow shaft 16 having the recessed hole 24 passing through the hollow shaft 16 in the axial direction. However, there may be adopted a solid shaft comprising a recessed portion formed in a shaft end portion thereof. The embedded stopper 30 is press-fitted into the recessed portion, and the embedded stopper 30 is retractable in the recessed portion in the press-fitting direction at the time of assembling the bearing 51 for a wheel.

Figure 4:
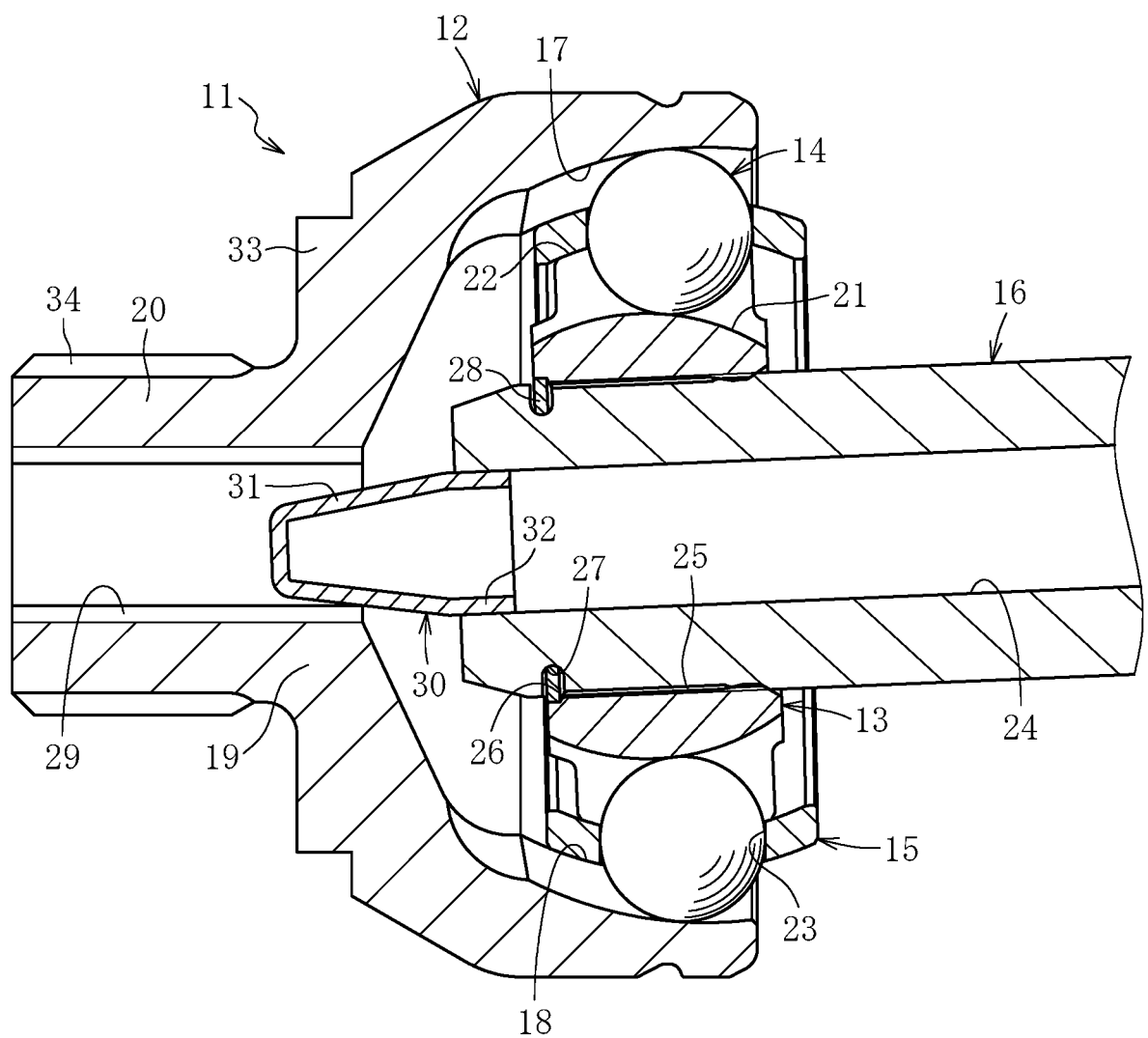
FIG. 4 is a sectional view for illustrating a state in which the hollow shaft is subjected to angle regulation by the stopper structure in the fixed type constant velocity universal joint of FIG. 1.

In the constant velocity universal joint 11, as illustrated in FIG. 4, the embedded stopper 30, which enters the threaded hole 29 of the bottom portion 19 of the outer joint member 12, is press-fitted into the recessed hole 24 of the shaft end portion of the hollow shaft 16. With this structure, at the time of handling the constant velocity universal joint 11, for example, at the time of transporting the constant velocity universal joint 11 or assembling the constant velocity universal joint 11 to a vehicle body, the distal end portion 31 of the embedded stopper 30 is brought into abutment against the inner peripheral surface of the threaded hole 29 at an angle smaller than an angle causing the balls 14 to drop off, thereby allowing the embedded stopper 30 to interfere with the threaded hole 29.

In this manner, the embedded stopper 30 interferes with the threaded hole 29, to thereby exert the stopper function of regulating the operating angle of the hollow shaft 16 to the angle smaller than the angle causing the balls 14 to drop off. As a result, at the time of handling the constant velocity universal joint 11, the balls 14 can be prevented from slipping and dropping off the track grooves 17 of the outer joint member 12.

It is only required that the embedded stopper 30 have enough strength to reliably subject the hollow shaft 16 to angle regulation without deforming at the time of interference with the threaded hole 29. The embedded stopper 30 may be made of metal or a resin. When reduction in weight of the constant velocity universal joint 11 is taken into consideration, an embedded stopper made of a resin such as a reinforced plastic is effective.

As described above, the operating angle of the hollow shaft 16 is regulated through interference between the embedded stopper 30 of the hollow shaft 16 and the threaded hole 29 of the outer joint member 12. Accordingly, unlike in the related art, it is not required to extend the shaft end portion of the hollow shaft. Thus, reduction in weight of the constant velocity universal joint 11 can be achieved. Further, it is not required to form a protrusion on the hollow shaft. Thus, a material diameter of the hollow shaft can be reduced, and reduction in cost of the constant velocity universal joint 11 can be achieved.

Figure 5:
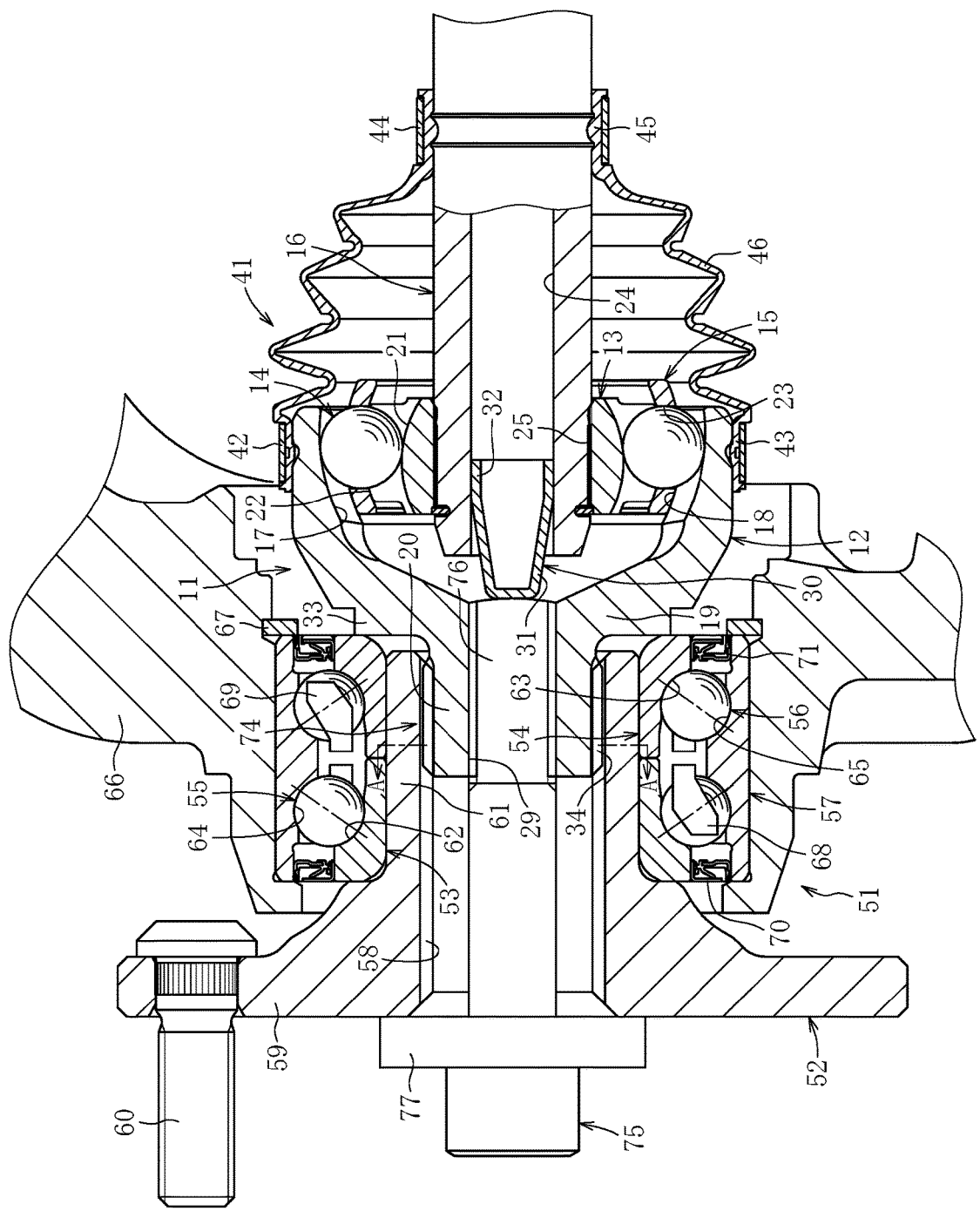
FIG. 5 is a sectional view for illustrating a bearing device for a wheel obtained by assembling the fixed type constant velocity universal joint of FIG. 1 to a bearing for a wheel.

As illustrated in FIG. 5, the above-mentioned constant velocity universal joint 11 is assembled to the bearing 51 for a wheel mounted to a vehicle body under a state in which the boot 41 made of a resin or rubber is mounted between the outer joint member 12 and the hollow shaft 16 in order to prevent leakage of a lubricant such as grease sealed in the joint and to prevent entry of foreign matters from an outside of the joint. Thus, the constant velocity universal joint 11 constructs the bearing device for a wheel. The boot 41 and the bearing 51 for a wheel have the following structures.

The boot 41 comprises a large-diameter end portion 43 fastened and fixed to an outer peripheral surface of the outer joint member 12 with a boot band 42, a small-diameter end portion 45 fastened and fixed to an outer peripheral surface of the hollow shaft 16 with a boot band 44, and a flexible bellows portion 46 that connects the large-diameter end portion 43 and the small-diameter end portion 45 to each other and is reduced in diameter from the large-diameter end portion 43 toward the small-diameter end portion 45.

In the constant velocity universal joint 11, an opening portion of the outer joint member 12 is closed by the boot 41, and the lubricant is sealed in an internal space of the outer joint member 12. Thus, during operation of the joint, lubricating ability is secured in a sliding region inside the joint, that is, the sliding region constructed by the outer joint member 12, the inner joint member 13 received in the outer joint member 12, the balls 14, and the cage 15.

Meanwhile, the bearing 51 for a wheel comprises, as main components, a hub wheel 52 and a pair of inner rings 53 and 54 that serve as inner members, double-row rolling elements 55 and 56, and an outer ring 57 that serves as an outer member.

The hub wheel 52 has a shaft hole 58 into which the outer joint member 12 of the constant velocity universal joint 11 is coupled so as to allow torque transmission. Further, the hub wheel 52 comprises a wheel mounting flange 59 to which a wheel (not shown) is mounted. Hub bolts 60 configured to fix a wheel disc are embedded in the wheel mounting flange 59 at equiangular intervals. The pair of inner rings 53 and 54 is fitted to a small-diameter step portion 61 formed on an inboard side of the hub wheel 52. The inner rings 53 and 54 are press-fitted with appropriate interference margins in order to prevent creep.

An outboard-side inner raceway surface 62, which is formed on an outer peripheral surface of one inner ring 53 of the pair of inner rings 53 and 54, and an inboard-side inner raceway surface 63, which is formed on an outer peripheral surface of another inner ring 54 of the pair of inner rings 53 and 54, construct the double-row inner raceway surfaces 62 and 63. The inner rings 53 and 54 are press-fitted to the small-diameter step portion 61 of the hub wheel 52, and the inboard-side inner ring 54 is brought into abutment against a shoulder portion 33 of the outer joint member 12. In this manner, the inner rings 53 and 54 are prevented from slipping off, and preload is applied to the bearing 51 for a wheel.

The outer ring 57 comprises double-row outer raceway surfaces 64 and 65 formed on an inner peripheral surface thereof to be opposed to the inner raceway surfaces 62 and 63 of the inner rings, and the outer ring 57 is mounted to a knuckle 66 extending from a suspension device of the vehicle body (not shown). A snap ring 67 prevents the outer ring 57 from slipping off the knuckle 66.

The above-mentioned bearing 51 for a wheel comprising the hub wheel 52, the inner rings 53 and 54, the rolling elements 55 and 56, and the outer ring 57 has the double-row angular contact ball bearing structure. In this structure, the rolling elements 55 and 56 are interposed between the inner raceway surfaces 62 and 63 formed on the outer peripheral surfaces of the inner rings 53 and 54, and the outer raceway surfaces 64 and 65 formed on the inner peripheral surface of the outer ring 57, and the rolling elements 55 and 56 in the respective rows are supported by retainers 68 and 69 at equiangular intervals.

At opening portions of both ends of the bearing 51 for a wheel, a pair of seals 70 and 71 configured to hermetically seal an annular space between the outer ring 57 and the inner rings 53 and 54 is fitted to inner peripheral surfaces of both end portions of the outer ring 57 so as to be held in slide contact with the outer peripheral surfaces of the inner rings 53 and 54. The pair of seals 70 and 71 prevents leakage of the lubricant such as grease sealed inside the bearing, and prevents entry of water and foreign matters from an outside of the bearing.

Figure 6:
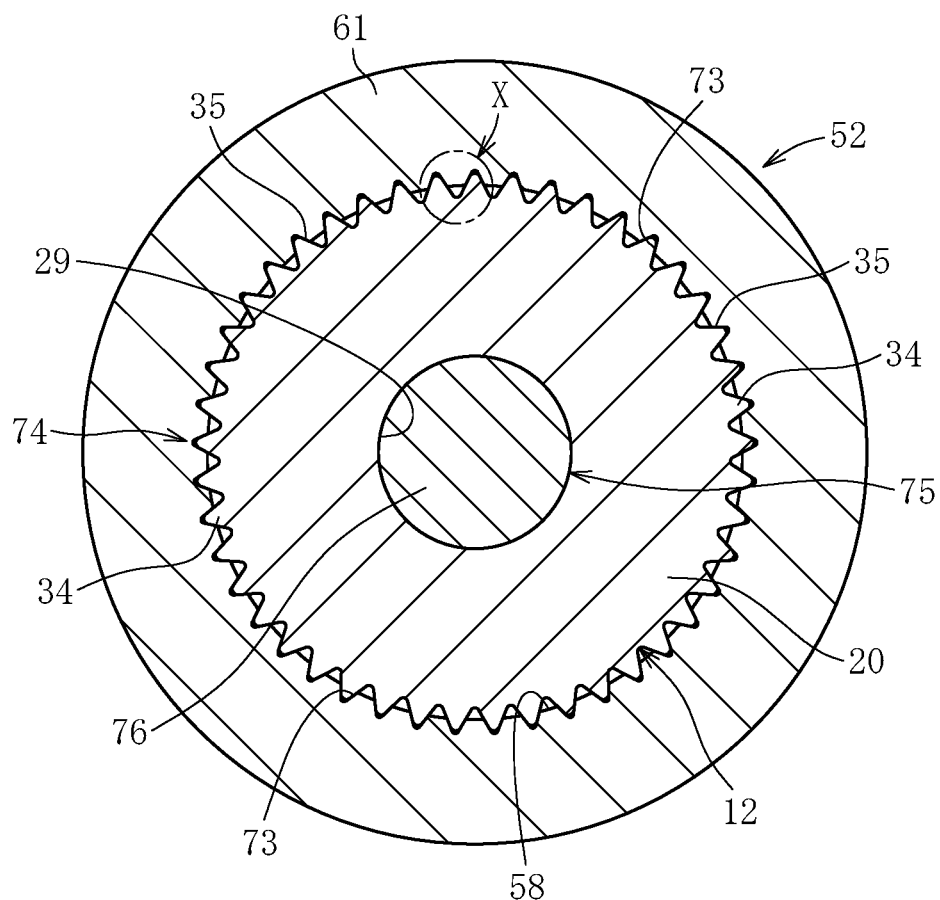
FIG. 6 is a sectional view taken along the line A-A of FIG. 5.

The bearing 51 for a wheel and the constant velocity universal joint 11 are coupled to each other with the following structure. FIG. 6 is a sectional view taken along the line A-A of FIG. 5, and FIG. 7 is an enlarged view for illustrating a portion X of FIG. 6.

Figure 7:
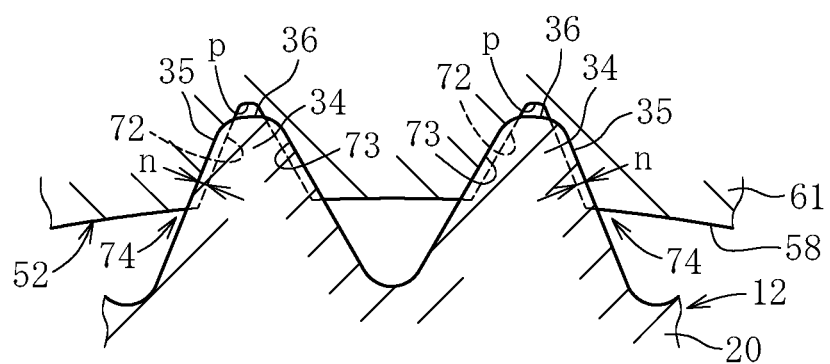
FIG. 7 is an enlarged sectional view for illustrating a portion X of FIG. 6 as a main part.

As illustrated in FIG. 6 and FIG. 7, a male spline comprising a plurality of protruding portions 34 extending in the axial direction is formed on an outer peripheral surface of a stem portion 20 of the outer joint member 12. In contrast, a plurality of recessed portions 72 (see the broken lines of FIG. 7) are formed in the inner peripheral surface of the shaft hole 58 of the hub wheel 52 at equiangular intervals so as to have interference margins "n" with respect to the above-mentioned protruding portions 34.

In this case, a dimension of each of the recessed portions 72 in the circumferential direction is set to be smaller than that of each of the protruding portions 34. With this configuration, each of the recessed portions 72 has the interference margin "n" with respect to only a peripheral side wall portion 35 of each of the protruding portions 34. Further, a dimension of each of the recessed portions 72 in the radial direction is set to be larger than that of each of the protruding portions 34. With this configuration, a gap "p" is formed between each of the recessed portions 72 and a portion of each of the protruding portions 34 excluding the peripheral side wall portion 35, that is, a radial distal end portion 36 of each of the protruding portions 34.

In the structure described above, the stem portion 20 of the outer joint member 12 is press-fitted into the shaft hole 58 of the hub wheel 52. Through the press-fitting, the peripheral side wall portion 35 of each of the protruding portions 34 extremely slightly forms a recessed-portion forming surface in the shaft hole 58 by cutting work, and extremely slightly deforms the recessed-portion forming surface plastically and elastically. Accompanied with this, the peripheral side wall portion 35 of each of the protruding portions 34 transfers a shape of the peripheral side wall portion 35 of each of the protruding portions 34 onto the recessed-portion forming surface, to thereby form a recessed portion 73.

At this time, the peripheral side wall portions 35 of the protruding portions 34 bite into the recessed-portion forming surfaces, to thereby bring the inner diameter of the hub wheel 52 into a slightly increased state. Thus, relative movement of the protruding portions 34 in the axial direction is allowed. When the relative movement of the protruding portions 34 in the axial direction is stopped, a diameter of the shaft hole 58 of the hub wheel 52 is reduced so as to be restored to an original diameter. Thus, there are formed protrusion-and-recess fitting portions 74 in which the protruding portions 34 and the recessed portions 73 are held in close contact with each other in entire fitting and contact regions. In this manner, the bearing 51 for a wheel and the constant velocity universal joint 11 are firmly coupled and integrated together.

The protrusion-and-recess fitting portions 74 of this embodiment has a structured having the interference margins "n" with respect to only the peripheral side wall portions 35 of the protruding portions 34. However, the protrusion-and-recess fitting portions 74 may be structured to have the interference margins "n" with respect to not only the peripheral side wall portions 35 of the protruding portions 34 but also the entire protruding portions 34 including the radial distal end portions 36.

In the structure for coupling the bearing 51 for a wheel and the constant velocity universal joint 11 together, fastening is performed under a state in which a head portion 77 of a bolt 75 is held in abutment against an end surface of the hub wheel 52 by threadedly engaging a threaded portion 76 of the bolt 75 with the threaded hole 29 of the stem portion 20 of the outer joint member 12. In this manner, the constant velocity universal joint 11 is fixed to the bearing 51 for a wheel.

Further, in the above-mentioned protrusion-and-recess fitting portions 74, the recessed portions 72 having the interference margins "n" are formed in advance in portions into which the protruding portions 34 are to be press-fitted. Thus, with small press-fitting load, that is, with a drawing force exerted by the bolt 75, the stem portion 20 of the outer joint member 12 can be press-fitted into the shaft hole 58 of the hub wheel 52, and the constant velocity universal joint 11 can be easily assembled to the bearing 51 for a wheel.

When the stem portion 20 of the outer joint member 12 is press-fitted into the shaft hole 58 of the hub wheel 52 with the drawing force exerted by the bolt 75, the threaded portion 76 of the bolt 75 pushes out the embedded stopper 30 that enters the threaded hole 29 of the outer joint member 12. Thus, the embedded stopper 30 is retracted into the hollow shaft 16 in the press-fitting direction of the embedded stopper 30.

Figure 8:
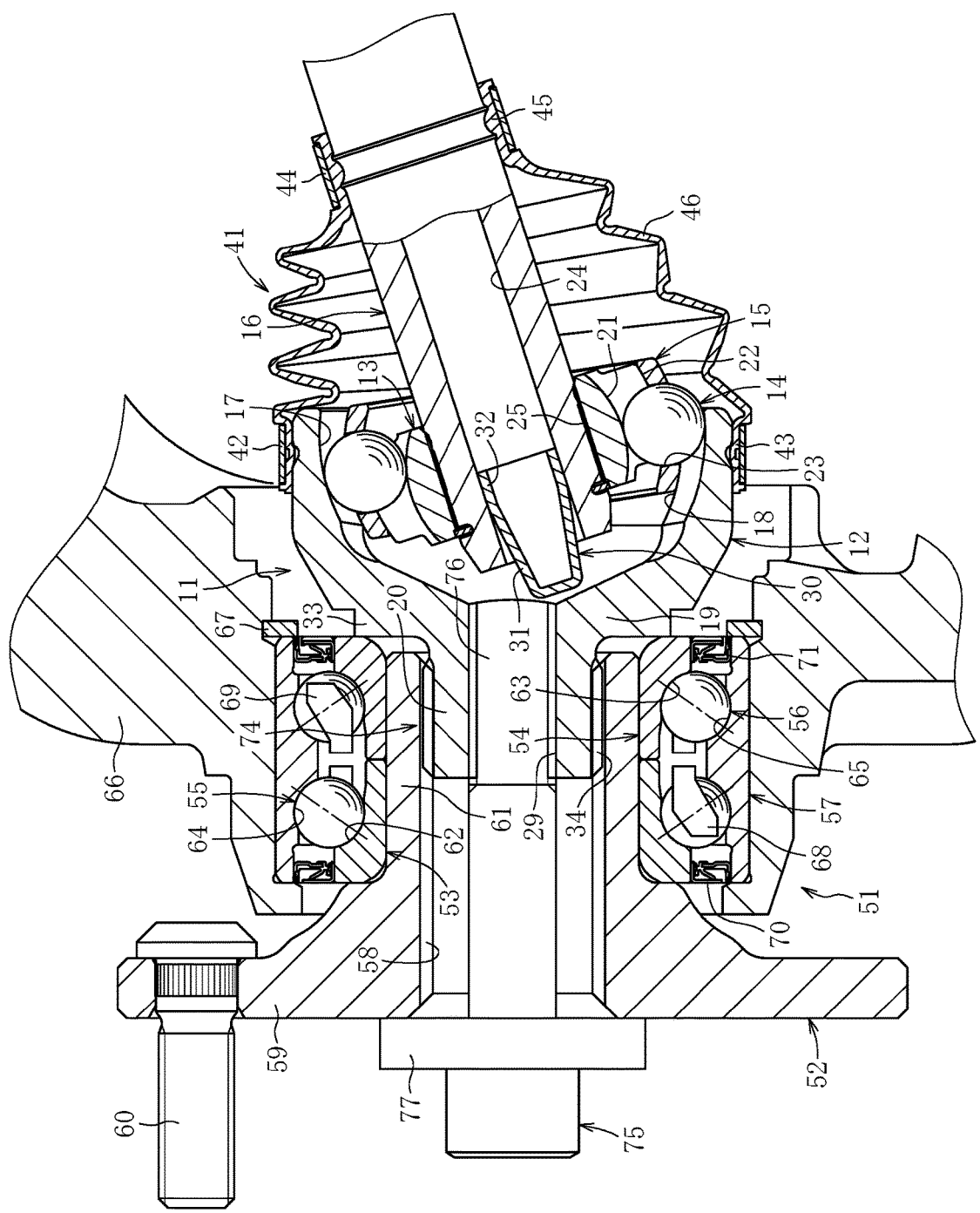
FIG. 8 is a sectional view for illustrating a state in which the hollow shaft of the fixed type constant velocity universal joint of FIG. 5 forms an operating angle.

In this manner, the embedded stopper 30 is retracted into the hollow shaft 16, thereby canceling the stopper function of the embedded stopper 30 for regulating the angle of the hollow shaft 16 before assembling the constant velocity universal joint 11 to the vehicle body. That is, when the distal end portion 31 of the embedded stopper 30 is released from the threaded hole 29 of the outer joint member 12, as illustrated in FIG. 8, the constant velocity universal joint 11 assembled to the vehicle body can form a required operating angle.

As described above, owing to adoption of the structure in which the embedded stopper 30 is retractable into the hollow shaft 16 by pushing the embedded stopper 30 out of the threaded hole 29 by the threaded portion 76 of the bolt 75 threadedly engaged with the threaded hole 29, after assembling the constant velocity universal joint 11 to the vehicle body, with simple means, the stopper function of the embedded stopper 30 for regulating the angle of the hollow shaft 16 can be easily canceled.

With the stopper structure comprising the embedded stopper 30 in the hollow shaft 16 and the threaded hole 29 of the outer joint member 12, before assembling the constant velocity universal joint 11 to the vehicle body, the angle of the hollow shaft 16 can be regulated. Further, after assembling the constant velocity universal joint 11 to the vehicle body, angle regulation on the hollow shaft 16 is canceled so that the constant velocity universal joint 11 can form a required operating angle.

The present invention is not limited to the above-mentioned embodiments. As a matter of course, the present invention may be carried out in various modes without departing from the spirit of the present invention. The scope of the present invention is defined in claims, and encompasses equivalents of the features described in claims and all changes within the scope of claims.

The invention claimed is:

1. A fixed type constant velocity universal joint, comprising:
an outer joint member having a cup shape;
an inner joint member, which is received in the outer joint member, and is configured to transmit torque between the inner joint member and the outer joint member through intermediation of balls while allowing angular displacement;
a shaft, which is coupled to the inner joint member so as to allow torque transmission; and
an angle regulating member which regulates an operation angle of the shaft,
wherein a through-hole is formed in a bottom portion of the outer joint member along an axial direction,
wherein a recessed portion is formed to be open in a shaft end portion of the shaft opposed to the through-hole,
wherein the angle regulating member comprises a distal end portion that enters the through-hole through a radial gap, and a proximal end portion that is press-fitted into the recessed portion,
wherein the angle regulating member is retractable into the shaft in a press-fitting direction, and
wherein when the fixed type constant velocity universal joint is assembled to a bearing for a wheel, which supports a wheel, the distal end portion of the angle regulating member is released from the through hole under a state in which the proximal end portion of the angle regulating member is press-fitted into the recessed portion.

2. A bearing device for a wheel, comprising a bearing for a wheel including:
an outer member having double-row outer raceway surfaces formed on an inner peripheral surface thereof;
an inner member having double-row inner raceway surfaces formed on an outer peripheral surface thereof to be opposed to the double-row outer raceway surfaces; and
double-row rolling elements, which are interposed between the double-row outer raceway surfaces of the outer member and the double-row inner raceway surfaces of the inner member,
wherein the inner member of the bearing for a wheel and the outer joint member of the fixed type constant velocity universal joint of claim 1 are coupled to each other so as to allow torque transmission,
wherein the through-hole of the outer joint member includes a threaded hole, and
wherein the distal end portion of the angle regulating member is released from the threaded hole under a state in which the proximal end portion of the angle regulating member is press-fitted into the recessed portion by threadedly engaging a threaded portion of a bolt with the threaded hole, and the angle regulating member is pushed out of the threaded hole and is retracted into the shaft in the press-fitting direction.

3. The fixed type constant velocity universal joint according to claim 1, wherein the shaft has a hollow shape such that the recessed portion passes through the shaft in the axial direction.

4. A bearing device for a wheel, comprising a bearing for a wheel including:
an outer member having double-row outer raceway surfaces formed on an inner peripheral surface thereof;
an inner member having double-row inner raceway surfaces formed on an outer peripheral surface thereof to be opposed to the double-row outer raceway surfaces; and
double-row rolling elements, which are interposed between the double-row outer raceway surfaces of the outer member and the double-row inner raceway surfaces of the inner member, wherein the inner member of the bearing for a wheel and the outer joint member of the fixed type constant velocity universal joint of claim 3 are coupled to each other so as to allow torque transmission, wherein the through-hole of the outer joint member includes a threaded hole, and wherein the distal end portion of the angle regulating member is released from the threaded hole under a state in which the proximal end portion of the angle regulating member is press-fitted into the recessed portion by threadedly engaging a threaded portion of a bolt with the threaded hole, and the angle regulating member is pushed out of the threaded hole and is retracted into the shaft in the press-fitting direction.

* * * * *